J. KARPOUICH.
MACHINE FOR BENDING ANGLE IRON.
APPLICATION FILED OCT. 19, 1918.

1,380,482.

Patented June 7, 1921.
3 SHEETS—SHEET 1.

Inventor.
John Karpouich
by Heard, Smith & Tennant
Attys.

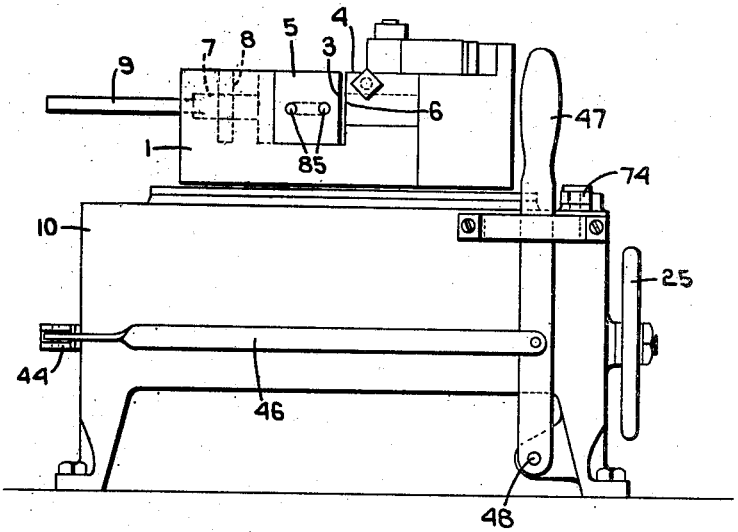
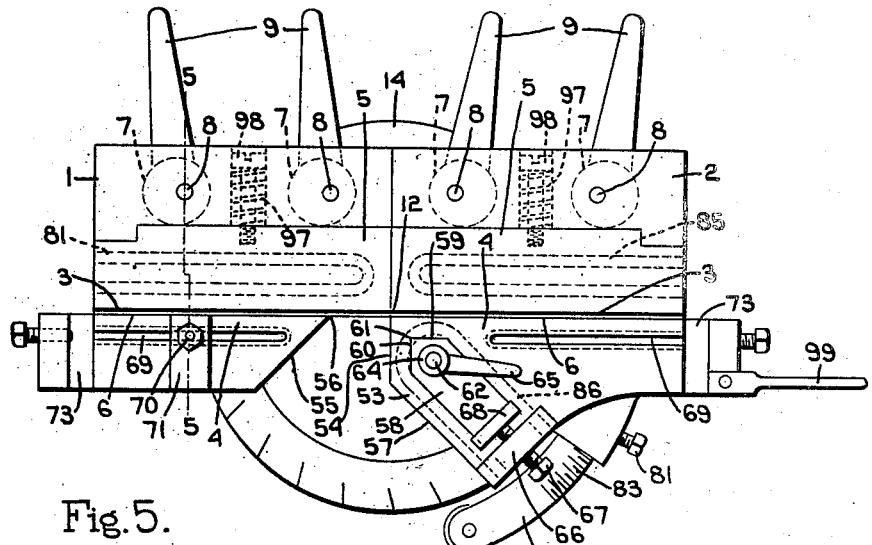
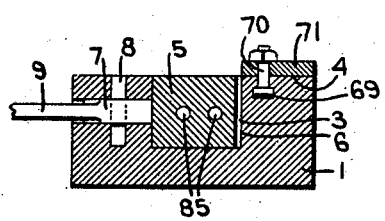

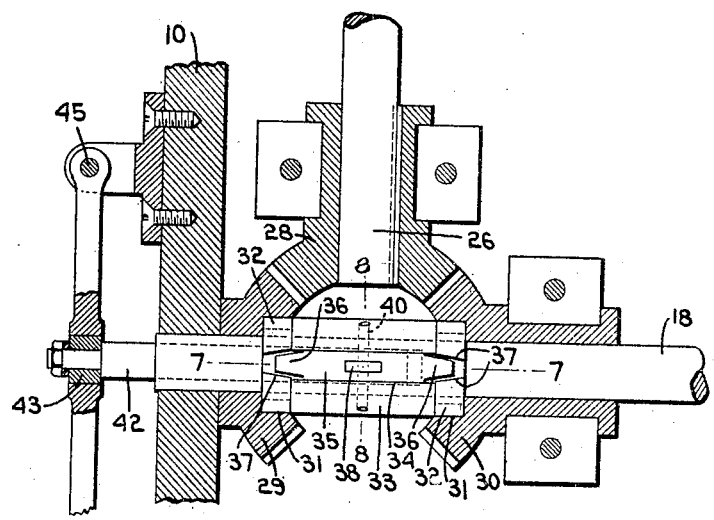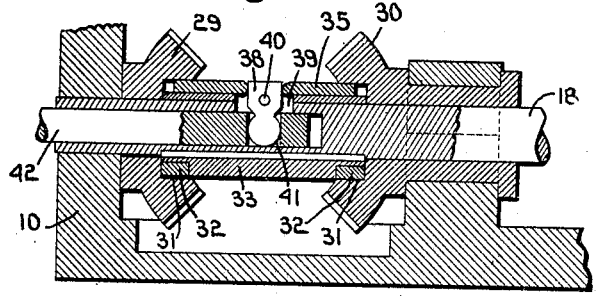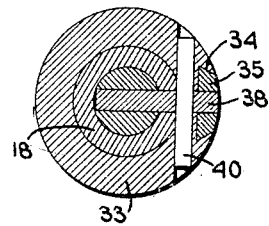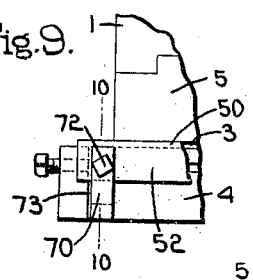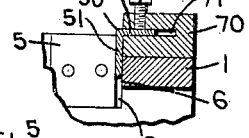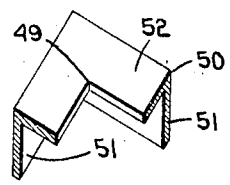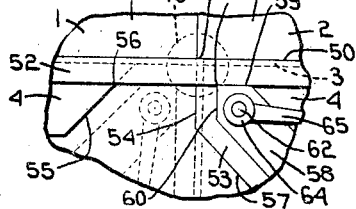

UNITED STATES PATENT OFFICE.

JOHN KARPOUICH, OF BOSTON, MASSACHUSETTS.

MACHINE FOR BENDING ANGLE-IRON.

1,380,482.   Specification of Letters Patent.   Patented June 7, 1921.

Application filed October 19, 1918. Serial No. 258,791.

*To all whom it may concern:*

Be it known that I, JOHN KARPOUICH, a citizen of the United States, residing at Boston, county of Suffolk, State of Massachusetts, have invented an Improvement in Machines for Bending Angle-Iron, of which the following description, in connection with the accompanying drawing, is a specification, like characters on the drawing representing like parts.

This invention relates to a machine for bending angle iron and has for its object to provide a novel machine for this purpose which is relatively simple in its construction, which is easy to operate and by means of which an angle iron can be expeditiously bent to any desired angle.

In order to give an understanding of my invention, I have illustrated in the drawings a selected embodiment thereof which will now be described, after which the novel features will be pointed out in the appended claims.

Fig. 3 is a side elevation;

Fig. 4 is a plan view of the work-holding members;

Fig. 5 is a section on the line 5—5, Fig. 4;

Fig. 6 is a sectional view through the reversing clutch;

Fig. 7 is a section on the line 7—7, Fig. 6;

Fig. 8 is an enlarged section on the line 8—8, Fig. 6;

Fig. 9 is a detail showing one of the gages for positioning the angle-iron to be bent;

Fig. 10 is a section on the line 10—10, Fig. 9;

Fig. 11 is a detail view showing the operation of bending a piece of angle iron;

Fig. 12 shows a piece of angle iron bent on my improved machine.

Figure 1:
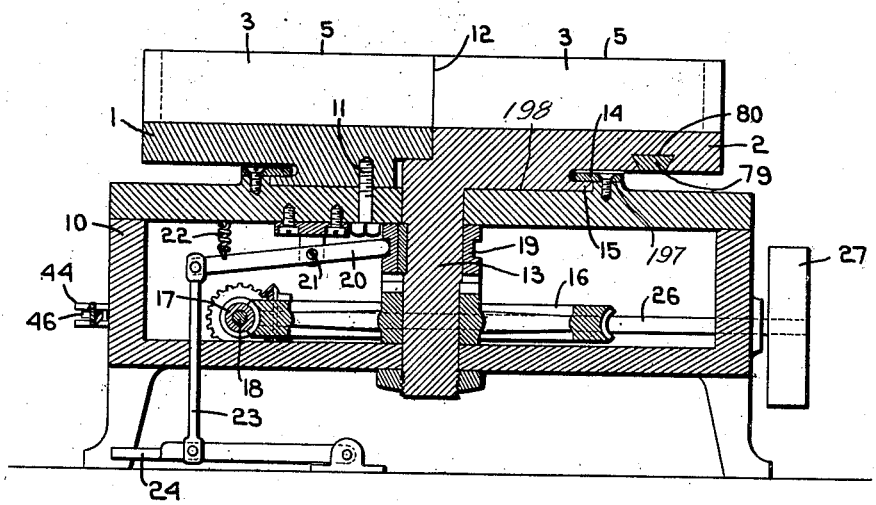
Figure 1 is a vertical section through the machine on the line 1—1, Fig. 2.

The machine herein shown is of that type which comprises two work-holding members adapted to engage and clamp two different portions of a piece of angle iron to be bent and means to move said work-clamping members relative to each other to effect the bending of the angle iron. The two work-holding members are indicated generally at 1 and 2, each member being provided with a groove 3 to receive the leg 51 of the angle iron 50 and also being provided with a supporting surface 4 at right angles to the groove on which the other leg 52 of the angle iron is adapted to rest. Each work-holding member is provided with means for clamping the angle iron in its groove 3, and for this purpose is provided with a clamping member 5, which is received in a recess formed in the work-holding member and one edge of which forms one wall of the groove, and means for moving the clamping member 5 toward the other wall 6 of the groove. For thus operating the clamping member 5 each work-holding member is provided with a plurality of cams 7, each pivoted to turn about an axis 8, and each provided with a handle 9 by which it may be turned. These cams 7 are received in recesses formed in the side wall of each work-holding member.

These two work-holding members 1 and 2 are mounted on a suitable frame 10, which is provided with a flat circular work-supporting surface 198, surrounded by a flange 197. The work-holding member 1 is rigidly secured to the frame in some suitable way, as by means of bolts 11, and the work-holding member 2 is mounted on the frame to turn about a vertical axis which extends through the point 12 where the grooves 3 in the two work-holding members meet.

Figure 2:
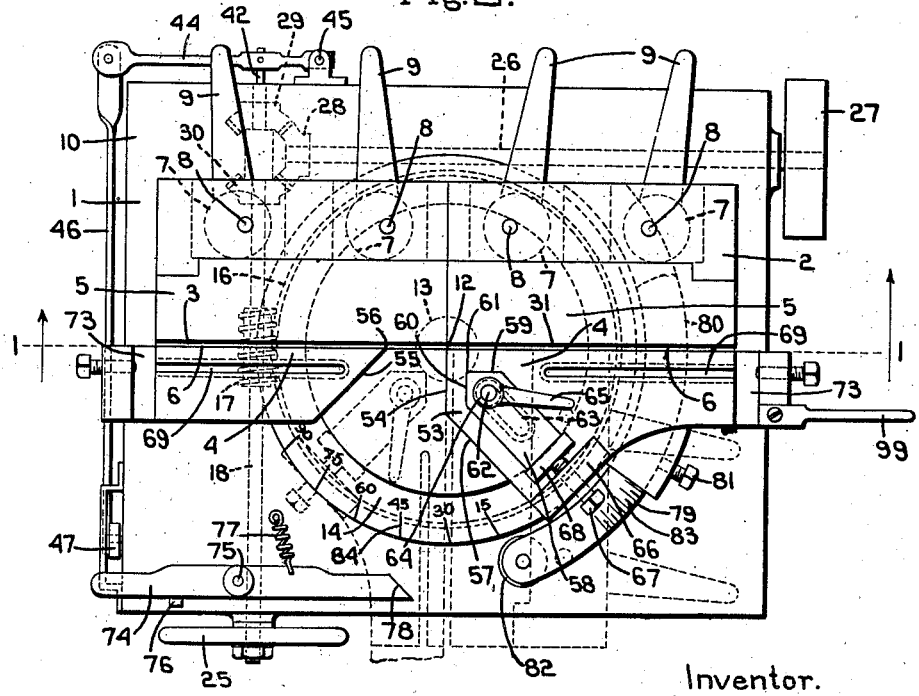
Fig. 2 is a top plan view of the machine.

From this it will be understood that if a length of angle iron is placed in the machine with one leg clamped in the grooves 3 and the other leg resting on the surfaces 4, and then the work-holding member 2 is turned about its axis 12 from its full to the dotted line position Fig. 2, the angle iron will be bent into the right-angular shape shown in Fig. 12. It will, of course, be understood that before this bending operation is performed the portion of the angle iron where the bend occurs will be suitably heated.

In order to provide for this turning movement of the work-holding member 2, said member has rigid therewith a spindle or shaft section 13 having its axis in line with the point 12, said spindle being suitably journaled in the frame 10, as clearly seen in Fig. 1. The frame 10 is also provided with a circular guiding plate or gib 14 which is secured to the flange 197 and engages a flange 15 formed on the work-holding member 2, said gib serving to guide the work-holding member in its turning movement.

I have provided means whereby the shaft section 13 may be turned either by hand or by power as desired. Loosely mounted on said shaft section is a worm gear 16 which meshes with a worm 17 fast on a shaft 18. The worm gear 16 is adapted to be clutched to the shaft section 13 by a suitable clutch member 19 which is keyed to the shaft section 13, but is slidably mounted thereon, said clutch member having a groove in which is received the forked end of an actuating lever 20 pivoted to the frame at 21. This lever is acted on by a spring 22 which normally tends to throw the clutch into engagement and said lever is connected by a link 23 to a treadle 24. This construction is such that when the treadle is depressed, the clutch 19 will be thrown out of engagement, thus disconnecting the worm gear 16 from the shaft section 13. When the treadle is released, the spring 22 will throw the clutch into engagement, thus connecting said worm gear to the shaft section 13.

The shaft 18 is provided with a hand-wheel 25 situated at the front of the machine by which it may be turned, and it is also provided with a reversible clutch by which it may be connected to a power driven shaft 26, thus providing for turning the shaft section 13 in either direction by power. The power driven shaft 26 is shown as having a driving pulley 27 thereon by which it may be operated.

While any suitable reversible clutch may be employed I have illustrated in Figs. 6 to 8 a clutch which has many advantages. The shaft 26 has fast thereon a beveled gear 28 which meshes with two bevel gears 29 and 30 that are loosely mounted on the shaft 18. Each bevel gear 29 and 30 is provided with a friction clutch surface 31 which is adapted to be engaged by an expanding clutch ring 32, said clutch rings being carried on the opposite ends of a sleeve 33 which is fast to the shaft 18. The sleeve 33 is provided with a groove 34 which preferably has undercut side walls, as shown in Fig. 8, and in which is slidably mounted a slide 35 having tapering ends 36, said ends being received between the ends of the expanding clutch rings 32. The ends of each ring are provided with the tapering surfaces 37 so that when the slide 35 is moved longitudinally to force the tapered end 36 thereof between the inclined edges 37, of either clutch ring, said ring will be expanded into clutching engagement with the clutch surface 31 of the corresponding bevel gear. When the slide 35 is in the central position shown in Fig. 6, then both clutches are free but a movement of the slide to the right will clutch the shaft 18 to the bevel gear 30, while a movement of the slide to the left will clutch said shaft 18 to the bevel gear 29. Any suitable means may be employed for actuating the slide. I have herein shown for this purpose a rocking member 38 which is located in the slot 39 formed in the sleeve and shaft 18 and which is pivoted to the sleeve at 40. The outer end of this rocking member 38 operates in a slot formed in the slide 35 and the inner end which is rounded is received in a slot 41 formed in an actuating rod 42 that is received in an axial recess formed in the end of the shaft 18. The outer end of the actuating rod 42 is rotatably mounted in a bearing 43 carried by a lever 44 which is pivoted to the frame at 45, said lever having its free end connected by a link 46 to a controlling lever 47 which in turn is pivoted to the frame at 48. By swinging the lever 47 in one direction or the other the actuating rod 42 will be moved to the right or to the left, Fig. 6, thereby to clutch either gear 30 or 29 to the shaft 18. The work-clamping member 2 may thus be turned by power through the desired angle, and when the angle iron has been bent to the proper shape the clutch may be shifted to neutral position thereby bringing the parts to rest. When the clutch is in neutral position the work-holding member 2 may be turned by means of a hand-wheel 25 if desired. When the angle iron is being bent the horizontal flange 52 will tend to buckle somewhat at the point where the bend occurs, and to prevent such buckling, the operator may hammer the horizontal leg at the bending point during the bending operation, such hammering tending to keep the horizontal flange smooth and even. The work-holding member 2 is provided with the extension 53 and with the face 54 which extends at right angles to the groove. The work-holding member 1 is shaped to present the inclined face 55, the inner end of which terminates at the point 56. The point 56 is at the same distance from the axis 12 as the length of the face 54, and the extension 53 is of such shape that when the work-holding member 2 has been turned through 90° or into the dotted line position Fig. 2, the face 54 will fill the space between the points 12 and 56 and the edge 57 of the extension 53 will lie against the face 55. The surface 4 of the extension 53 will thus be continuous with the surface 4 of the work-holding member 1, and these two surfaces will form a solid support for the flange 52 of the angle iron so that any wrinkles may be hammered out of said flange.

In order to assist in forming a sharp corner at the point 49 in the bent flange 52, I have provided the extension 53 with a gage member 58 which is provided with an edge 59 against which one edge of the leg 52 of the angle iron rests, and is provided with another edge 60 extending at right angles to the edge 59, the two edges making a point 61 which bears against the edge of the angle iron leg 52. When the work-holding member 2 is moved into the dotted line position shown in Figs. 2 and 11, the point 61 of the gage member 58 will serve to form the sharp angle at the point 49 as indicated in Fig. 12. This gage member 58 is adjustably mounted on the surface 4 of the work-holding member 2 so that it can be moved in a radial direction. For this purpose I have shown it as provided with a clamping stud 62 having a head operating in a slot 63 formed in the extension 53, the upper end of the stud having a nut 64 screw-threaded thereto, which nut is provided with a handle 65. By turning the handle in one direction the gage member will be firmly clamped in position, and by turning the handle in the opposite direction said gage member is unclamped and can be adjusted longitudinally of the slot 63. I have also provided the extension 53 with a vertical flange 66 carrying a screw 67 which is adapted to engage a block 68 at the end of the gage member 58, said block and screw assisting in holding the gage member in proper adjusted position.

I have also provided positioning means by which an angle iron may be properly positioned in the groove 3 before it is bent.

The two work-holding members 1 and 2 are shown as provided with undercut slots 69 adapted to receive clamping bolts 70 which extend through positioning plates 71 that overlie the surfaces 4. These plates will be used when a short length of angle iron is to be bent, and when used will be adjusted so that the angle iron may be placed between them with the ends of the legs 52 resting against said positioning plates. These plates are intended for use where a number of duplicate short lengths of angle iron are to be bent.

In case the length of angle iron to be bent is so long as to project beyond the ends of the grooves 3, then I propose to use positioning members of the type shown in Figs. 9 and 10. These positioning members comprise blocks 70 having grooves 71 adapted to receive the leg 52 of the angle iron 50, each block having a clamping screw 72 by which it may be clamped to said angle iron leg. Each of the work-holding members is provided with a recess or groove 73 adapted to receive a block 70. These blocks 70 may be clamped to the angle iron at the proper positions, and when the angle iron has been heated at the bending point, it may be placed in the groove 3 with the attached positioning blocks 70 occupying the recesses 73, as shown in Fig. 9.

I have also provided means for automatically disconnecting the clutch when the angle iron is bent to the proper position. For this purpose I have provided a clutch-disengaging lever 74 which is pivoted to the frame at 75 and is held in its normal position against the stop 76 by the spring 77. One end of this lever is beveled, as at 78, and the other end is adapted to engage the controlling lever 47. The movable work-holding member is provided with an adjustable knock-off slide 79 which is received in a groove 80 formed in the underside of said work-holding member and which is held in said groove in the desired adjusted position by the set-screw 81. The outer end of this knock-off member 79 is provided with a roll 82 which is adapted to engage the inclined surfaces 78 of the clutch-disengaging lever 74. This member 79 may be adjusted so as to engage the lever thereby to cause the latter to actuate the controlling lever 47 to disengage the clutch when the angle iron has been bent to the desired angle. The adjustability of the knock-off member 79 provides for disengaging the clutch when the work-holding member 2 has moved through any desired angle less than 90°.

The knock-off member 79 is provided with a scale 83 to assist in adjusting it and the plate or gib 14 is provided with graduation marks 84 so that the amount of turning movement of said member may be determined.

In order to prevent undue heating of the clamping members 5 I provide each of them with a chamber 85 through which water may be circulated. The ends of each chamber will be connected to suitable pipes, not shown, and the pipes leading to the water chamber in the clamping block carried by the movable work-holding member will be flexible so as to permit movement of said member. Similarly, I have provided the movable work-holding member with another water-circulating chamber 86 adjacent the gage member 58, the purpose of this being to keep the parts cool.

99 is a projection extending from the movable work-supporting member and which constitutes a handle by which it may be moved by hand if desired when the gear 16 is unclutched from the shaft section 13. In Fig. 4, I have shown each clamping member 5 as having a screw 98 secured thereto which is acted upon by a spring 97. These springs tend to keep the clamping members against the face of the cams 7.

I claim:

1. In a machine for bending metal, the combination with a frame having a flat circular supporting surface surrounded by a flange, of a fixed work-holding member sustained on said supporting surface and fixedly secured to the frame, a second work-holding member also supported on said supporting surface and mounted to turn about a vertical axis, each work-holding member having means for clamping the work thereto, said second work-holding member having a curved guiding flange, a circular guiding plate secured to the flange on the frame and overlying the guiding flange of the work-holding member, and means to turn the second work-holding member about its axis.

2. In a machine for bending angle iron, the combination with a frame, of a work-holding member fast thereto, a second work-holding member provided with a shaft section journaled in the frame, said work-holding members each having a groove to receive one leg of the angle iron to be bent and one of said members having an undercut slot parallel to the groove, a clamping bolt adjustable in said slot, and a positioning plate adjustably clamped to the work-holding member by said bolt.

3. In a machine for bending metal, the combination with a frame having a circular flat supporting surface surrounded by a flange, of work-holding members sustained on said surfaces one of said members being fixedly secured to the frame and the other mounted to turn about a vertical axis and provided with a circular guiding flange engaging the flange of the frame, a circular guiding plate secured to the flange of the frame and overlying the flange of the movable work-holding member, the latter projecting beyond said plate, means to turn the movable work-holding member about its axis, a clutch controlling said means, a knock-off lever for the clutch and a curved arm carried by the extended portion of the movable work-holding member and adapted to engage said knock-off lever.

4. In a machine for bending metal, the combination with a frame, of a work-holding member fixed thereto, a second work-holding member mounted thereon to turn about a vertical axis, each work-holding member being recessed in its upper face, a clamping member received in each recess and adapted to clamp the work between it and one wall of the recess, each work-holding member also having a plurality of recesses in its side communicating with the first named recess and cams pivoted in the recesses and acting against the clamping member.

In testimony whereof, I have signed my name to this specification.

JOHN KARPOUICH.